Oct. 18, 1932.  C. J. BECKWITH  1,883,485
LAMINATED SHEET BUILDING MATERIAL
Filed Feb. 27, 1928
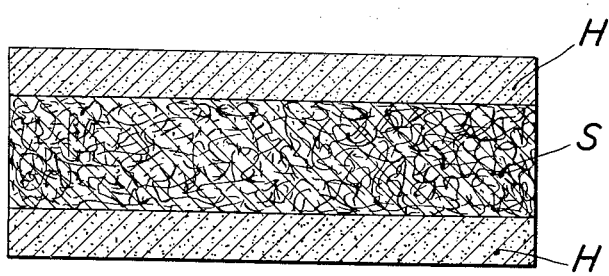
Inventor
Charles J. Beckwith,
by Roberts Cushman + Woodbury
Attys.

Patented Oct. 18, 1932

1,883,485

UNITED STATES PATENT OFFICE

CHARLES J. BECKWITH, OF NEW YORK, N. Y., ASSIGNOR TO JOHNS-MANVILLE CORPORATION, OF NEW YORK, N. Y., A CORPORATION OF NEW YORK

LAMINATED SHEET BUILDING MATERIAL

Application filed February 27, 1928. Serial No. 257,275.

Objects of the present invention are to provide composite sheet material for building houses, refrigerators, switchboards, etc., which is free from the defects of wall boards as heretofore constructed and which has the following advantages: structural strength both in compression and flexure; lightness; sound-absorptiveness; high insulating properties against both temperature and potential differences; relative non-frangibility; relatively water resistant according to surface finish; and capability of taking a polish on one or both surfaces.

This new sheet building material is characterized by surface strata of sufficient hardness, stiffness and thickness to afford structural strength, in contradistinction to a surface coating of paper, cardboard or veneer board, and in addition is so constituted as to have the property of taking a polish, so that in the preferred embodiment, the surface may be rendered substantially as smooth as polished stone. This is particularly important for switchboards, refrigerators, etc. where a smooth surface is essential not only for appearance but also for cleanliness. In the case of switchboards, for example, a slight deposit of dust or oil largely reduces the insulation characteristic. So far as I am at present aware, best results are obtainable when using, for the surface strata, asbestos bonded in a hard dense mass with Portland cement, the asbestos preferably being partly or wholly in fibrous form. However, in the broader aspect, the invention is not confined to this specific composition, but comprehends variations having similar characteristics.

This invention is further characterized by one or more intermediate strata of relatively light, soft and porous insulating material, such as celotex, which is composed of bagasse fibers bonded together with suitable cementitious material. This intermediate material is relatively inexpensive and therefore reduces the cost for a given overall thickness of finished board. Moreover, it has high insulating qualities and owing to its porous character contributes in large degree to the sound-proof quality of the finished product, which is particularly important when the material is used for building walls, floors and ceilings, telephone booths, etc. However, perhaps the chief advantage in using such material between the hard surface layers is greatly to reduce the frangibility of the product; whereas a solid board of asbestos or the like is likely to crack or shatter if subjected to a heavy stress or sharp blow, by dividing the hard material into two strata with relatively soft material therebetween, the product is less subject to breakage, chiefly due to the cushioning action of the soft intermediate layer.

For the purpose of illustration the preferred embodiment is shown in the accompanying drawing, wherein H designates the hard surface strata and S the soft intermediate stratum. The respective layers may be formed separately and then cemented together under pressure but they are preferably moulded together before the surface strata have completely set. While the intermediate layer may also be incorporated before it has set, it is usually more convenient first to finish the intermediate layer and subsequently to apply the surface strata while wet, after which the whole is pressed to force the surface material into the surface irregularities of the porous core. In this way the layers may be ultimately interconnected and held together by the cementitious component of the surface strata; also additional binding material (either like or different) may be applied to the surfaces of the intermediate layer before the surface layers are applied.

As stated above, this laminated board is unique in that its surfaces may be polished, for example as follows: A flat faced grinding wheel of very fine natural or artificial stone is moved over the surface while rotating slowly, the surface being kept wet with water or other liquid during the grinding operation. After a short time the fine particles, which are abraded from the sheet, form with the water a thick fluid or emulsion, and as the operation is continued this emulsion is consolidated with the surface to form a dense and smooth surface, the surface finally assuming a glossy sheen if the operation is continued long enough.

While the surface thus formed possesses some porosity (for example enough to permit impregnation with asphalt or other dielectric or waterproofing fluids), it is extremely dense and has little tendency to collect dust or dirt. Indeed it may be waxed and polished to a high degree.

From the foregoing it will be evident that this improved building material may be employed as either structural or finished material; it is thoroughly weather-proof so that it may be exposed exteriorly of a building; it is ornamental, fireproof, and non-corrodible; and it requires no solid backing and need not be painted.

I claim:

1. A laminated building material consisting of a backing layer of relatively light and porous insulating material and one or more facing layers comprising fibrous mineral material bonded in a hard dense mass with Portland cement, the respective layers being formed separately, and the facing layer or layers integrated by compressive intrusion of the mineral cement while still wet into the surface irregularities of the backing layer to bond the layers together.

2. A laminated building material consisting of a backing layer of relatively light and porous insulating material and one or more facing layers comprising fibrous mineral material bonded in a hard dense mass with Portland cement, the respective layers being formed separately, and the facing layer or layers integrated by compressive intrusion of the mineral cement while still wet into the surface irregularities of the backing layer to bond the layers together, and an additional bonding material between the layers.

3. A process of making a laminated building material, comprising a backing layer of relatively light, soft and porous insulating material and a face layer of mineral fiber bonded in a hard dense mass with Portland cement, the process being characterized by separate formation of the layers and pressing the several layers together while the mineral cement layer is still wet.

4. A process of making a laminated building material, comprising a backing layer of relatively light, soft and porous insulating material and a face layer of mineral fiber bonded in a hard dense mass with Portland cement, the process being characterized by separate formation of the layers and pressing the several layers together while the mineral cement layer is still wet, with the inter-position between the separately formed layers of an additional binding material of the character of Portland cement.

Signed by me at New York, New York, this 20th day of February, 1928.

CHARLES J. BECKWITH.